United States Patent
Bespalov et al.

(10) Patent No.: US 8,237,445 B2
(45) Date of Patent: Aug. 7, 2012

(54) OCTUPOLE INDUCTION SENSORS FOR RESISTIVITY IMAGING IN NON-CONDUCTIVE MUDS

(75) Inventors: Alexandre N. Bespalov, Spring, TX (US); Sheng Fang, Houston, TX (US)

(73) Assignee: Baker Hughes Incorporated, Houston, TX (US)

( * ) Notice: Subject to any disclaimer, the term of this patent is extended or adjusted under 35 U.S.C. 154(b) by 255 days.

(21) Appl. No.: 12/396,977

(22) Filed: Mar. 3, 2009

(65) Prior Publication Data
US 2009/0295393 A1 Dec. 3, 2009

Related U.S. Application Data

(63) Continuation-in-part of application No. 12/128,907, filed on May 29, 2008, now Pat. No. 8,036,830.

(51) Int. Cl.
*G01V 3/10* (2006.01)

(52) U.S. Cl. ........ 324/339; 324/303; 324/333; 324/338; 702/7

(58) Field of Classification Search .......... 324/323–375; 343/703, 709, 718–719; 367/1–86; 166/244.1–403
See application file for complete search history.

(56) References Cited

U.S. PATENT DOCUMENTS

| | | | |
|---|---|---|---|
| 3,808,520 A | 4/1974 | Runge | |
| 3,882,374 A | 5/1975 | McDaniel | |
| 3,973,181 A | 8/1976 | Calvert | |
| 4,468,623 A | 8/1984 | Gianzero et al. | |
| 4,780,678 A | 10/1988 | Kleinberg et al. | |
| 4,837,517 A | 6/1989 | Barber | |
| 5,157,605 A | 10/1992 | Chandler et al. | |
| 5,200,705 A | 4/1993 | Clark et al. | |
| 5,235,285 A | 8/1993 | Clark et al. | |
| 5,339,036 A | 8/1994 | Clark et al. | |
| 5,442,294 A * | 8/1995 | Rorden | 324/339 |
| 5,452,761 A | 9/1995 | Beard et al. | |
| 5,774,360 A | 6/1998 | Xiao et al. | |
| 5,999,883 A | 12/1999 | Gupta et al. | |
| 6,049,209 A | 4/2000 | Xiao et al. | |
| 6,903,553 B2 | 6/2005 | Itskovich et al. | |
| 6,957,708 B2 | 10/2005 | Chemali et al. | |
| 7,073,609 B2 | 7/2006 | Tabanou et al. | |
| 7,228,903 B2 | 6/2007 | Wang et al. | |
| 7,299,131 B2 | 11/2007 | Tabarovsky et al. | |
| 7,392,135 B2 * | 6/2008 | Varsamis et al. | 702/1 |
| 7,864,629 B2 * | 1/2011 | Jones et al. | 367/25 |
| 2005/0212520 A1 * | 9/2005 | Homan et al. | 324/338 |
| 2008/0068025 A1 | 3/2008 | Gold et al. | |

FOREIGN PATENT DOCUMENTS

WO   WO9800733   1/1998

* cited by examiner

*Primary Examiner* — Patrick Assoud
*Assistant Examiner* — Alesa Allgood
(74) *Attorney, Agent, or Firm* — Mossman, Kumar & Tyler, PC

(57) ABSTRACT

The present disclosure provides a method and apparatus for performing resistivity measurements of a borehole wall using a transverse octupole sensor. The sensor may be a resistivity sensor. Higher resolution is obtained with an octupole sensor than with lower-order-pole sensors. For the resistivity case, the ratio of dual-frequency measurements has reduced sensitivity to standoff.

13 Claims, 7 Drawing Sheets

(a) Quadrupole          (b) Octupole

(a) Quadrupole          (b) Octupole

OCTUPOLE INDUCTION SENSORS FOR RESISTIVITY IMAGING IN NON-CONDUCTIVE MUDS

CROSS-REFERENCE TO RELATED APPLICATIONS

This application is a continuation-in-part of U.S. patent application Ser. No. 12/128,907 filed on May 29, 2008.

1. FIELD OF THE DISCLOSURE

The present disclosure is related to both logging-while-drilling (LWD) and well-logging (WL). In particular, the present disclosure is an apparatus and a method for imaging electrical properties surrounding a borehole having a non-conductive mud therein during or after the drilling.

2. SUMMARY OF THE RELATED ART

Electromagnetic induction and wave propagation logging tools are commonly used for determination of electrical properties of formations surrounding a borehole. These logging tools give measurements of apparent resistivity (or conductivity) of the formation that, when properly interpreted, reasonably determine the petrophysical properties of the formation and the fluids therein.

The physical principles of electromagnetic induction resistivity well logging are described, for example, in H. G. Doll, *Introduction to Induction Logging and Application to Logging of Wells Drilled with Oil-Based Mud*, Journal of Petroleum Technology, vol. 1, p. 148, Society of Petroleum Engineers, Richardson, Tex. (1949). Many improvements and modifications to electromagnetic induction resistivity instruments have been devised since publication of the Doll reference, supra. Examples of such modifications and improvements can be found, for example, in U.S. Pat. Nos. 4,837,517; 5,157,605 issued to Chandler et al.; and U.S. Pat. No. 5,452,761 issued to Beard et al.

A typical electrical resistivity-measuring instrument is an electromagnetic induction multiarray well logging instrument such as described in U.S. Pat. No. 5,452,761 issued to Beard et al. The induction logging instrument described in the Beard '761 patent includes a number of receiver coils spaced at various axial distances from a transmitter coil. Alternating current is passed through the transmitter coil, which induces alternating electromagnetic fields in the earth formations. Voltages, or measurements, are induced in the receiver coils as a result of electromagnetic induction phenomena related to the alternating electromagnetic fields. A continuous record of the voltages forms curves, which are also referred to as induction logs. The induction instruments that are composed of multiple sets of receiver coils are referred to as multi-array induction instruments. Every set of receiver coils together with the transmitter is named as a subarray. Hence, a multi-array induction consists of numerous subarrays and acquires measurements with all the subarrays.

Voltages induced in the axially more distal receiver coils are the result of electromagnetic induction phenomena occurring in a larger volume surrounding the instrument, and the voltages induced in the axially proximal receiver coils are the result of induction phenomena occurring more proximal to the instrument. Therefore, different receiver coils see a formation layer boundary with different shoulder-bed contributions, or shoulder-bed effects. The longer-spaced receiver coils see the formation layer boundary at further distance from the boundary than the shorter-spaced receiver coils do. As a result, the logs of longer-spaced receiver coils have longer shoulder-bed effects than the logs of shorter-spaced receiver coils.

If the layers are not perpendicular to the axis of the instrument, the conductivity of the media surrounding the instrument can vary azimuthally, causing the inferences about the conductivity from the measurements of the induction voltage to be in error. A method for correcting the error is described in U.S. Pat. No. 5,774,360 to Xiao et al., having the same assignee as the present disclosure and the contents of which are incorporated herein by reference. The method uses the relative dip angle as a priori information. The relative dip angle is the angle between the borehole axis and the normal of the bedding plane. Because the formation layers can also be inclined, the relative dip angle is normally unknown even though the wellbore deviation is known. U.S. Pat. No. 6,049,209 to Xiao et al. teaches another method has also been developed to interpret induction logs in the environments of relative inclination and anisotropy. The method requires the relative dip angle and the anisotropy coefficient as a priori information. The anisotropy coefficient can be defined as the ratio between the resistivity perpendicular to bedding and the resistivity parallel to bedding.

A limitation to the electromagnetic induction resistivity well logging instruments known in the art is that they typically include transmitter coils and receiver coils wound so that the magnetic moments of these coils are substantially parallel only to the axis of the instrument. Eddy currents are induced in the earth formations from the magnetic field generated by the transmitter coil, and in the induction instruments known in the art. These eddy currents tend to flow in ground loops which are substantially perpendicular to the axis of the instrument. Voltages are then induced in the receiver coils related to the magnitude of the eddy currents. Certain earth formations, however, consist of thin layers of electrically conductive materials interleaved with thin layers of substantially non-conductive material. The response of the typical electromagnetic induction resistivity well logging instrument will be largely dependent on the conductivity of the conductive layers when the layers are substantially parallel to the flow path of the eddy currents. The substantially non-conductive layers will contribute only a small amount to the overall response of the instrument and therefore their presence will typically be masked by the presence of the conductive layers. The non-conductive layers, however, are those layers which are typically hydrocarbon-bearing and are of the most interest to the instrument user. Some earth formations which might be of commercial interest therefore may be overlooked by interpreting a well log made using the electromagnetic induction resistivity well logging instruments known in the art.

U.S. Pat. No. 5,999,883 issued to Gupta et al., the contents of which are fully incorporated herein by reference, discloses a method for determining the horizontal and vertical conductivity of anisotropic earth formations. Measurements are made of electromagnetic induction signals induced by induction transmitters oriented along three mutually orthogonal axes. One of the mutually orthogonal axes is substantially parallel to a logging instrument axis. The electromagnetic induction signals are measured using first receivers each having a magnetic moment parallel to one of the orthogonal axes and using second receivers each having a magnetic moment perpendicular to one of the orthogonal axes, which is also perpendicular to the instrument axis. A relative angle of rotation of the perpendicular one of the orthogonal axes is calculated from the receiver signals measured perpendicular to the instrument axis. An intermediate measurement tensor is calculated by rotating magnitudes of the receiver signals through a negative of the angle of rotation. A relative angle of inclination of one of the orthogonal axes, which is parallel to the axis of the instrument, is calculated from the rotated magnitudes with respect to the direction of the vertical conductivity. The rotated magnitudes are rotated through a negative of the angle of inclination. Horizontal conductivity is calculated from the magnitudes of the receiver signals after the second step of rotation. An anisotropy parameter is calculated from the receiver signal magnitudes after the second step of rotation. Vertical conductivity is calculated from the horizontal conductivity and the anisotropy parameter.

The relative formation dip angle is vital for proper and accurate interpretation of data acquired by the new multi-component induction instrument. This newly developed induction instrument comprises three mutually orthogonal transmitter-receiver arrays. These configurations allow determination of both horizontal and vertical resistivities for an anisotropic formation in vertical, deviated, and horizontal boreholes. A description of the tool can be found in WO 98/00733, Electrical logging of a laminated formation, by Beard et al (1998). The transmitters induce currents in all three spatial directions and the receivers measure the corresponding magnetic fields ($H_{xx}$, $H_{yy}$, and $H_{zz}$). In this nomenclature of the field responses, the first index indicates the direction of the transmitter, the second index denotes the receiver direction. As an example, $H_{zz}$ is the magnetic field induced by a z-direction transmitter coil and measured by a z-directed receiver. The z-direction is parallel to the borehole. In addition, the instrument measures all other cross-components of the magnetic fields, i.e., $H_{xy}$, $H_{xz}$, $H_{yx}$, $H_{yz}$, $H_{zx}$, and $H_{zy}$.

The signals acquired by the main receiver coils ($H_{xx}$, $H_{yy}$, and $H_{zz}$) are used to determine both the horizontal and vertical resistivity of the formation. This is done by inverse processing techniques of the data. These inverse processing techniques automatically adjust formation parameters in order to optimize in a least-square sense the data match of the synthetic tool responses with measured data. Required inputs in this process are accurate information of the relative formation dip and relative formation azimuth. This information can be derived using in addition to the main signals ($H_{xx}$, $H_{yy}$, and $H_{zz}$) the data from the cross-components.

Conventional induction tools comprising only coaxial transmitter-receiver coil configurations do not have azimuthal sensitivity. Therefore, in a horizontal wellbore, the data do not contain information about directionality of the formation. It is not possible to distinguish whether a layer is above or below the borehole from these data alone. There is a need to be able to determine directionality of the formation. U.S. Pat. No. 6,903,553 to Itskovich et al. discloses a quadrupole system that enables MWD resistivity measurements with azimuthally sensitivity. The system includes a dual loop transmitter and one coil receiver placed between transmitting coils. In order to provide large depth of investigation the quadrupole system is preferably combined with existing MPR tools. To reduce ambiguity due to zero crossings in the data multi-frequency measurements as well as the measurements of both in-phase and quadrature components are performed. The present disclosure deals with a multipole system that has higher resolution than a quadrupole system.

SUMMARY OF THE DISCLOSURE

One embodiment of the disclosure is an apparatus for evaluating an earth formation. The apparatus includes a logging tool configured to be conveyed into a borehole; a transverse octupole transmitter on the logging tool configured to transmit a signal into the formation; a transverse dipole receiver configured to receive a signal from the formation in response to the transmitted signal; and at least one processor configured to estimate from the received signal a value of a property of the earth formation.

Another embodiment of the disclosure is a method of evaluating an earth formation. The method includes conveying a logging tool into a borehole; using a transverse octupole transmitter on the logging tool to transmit a signal into the formation; using a transverse dipole receiver to receive a signal from the formation in response to the transmitted signal; and estimating from the received signal a value of a property of the earth formation.

Another embodiment of the disclosure is a computer-readable medium accessible to at least one processor, the computer-readable medium including instructions which enable the at least one processor to estimate from a signal received by a transverse dipole receiver on a logging tool in a borehole responsive to activation of a transverse octupole transmitter on the logging tool a value of a property of the earth formation.

BRIEF DESCRIPTION OF THE FIGURES

The novel features of this disclosure, as well as the disclosure itself, will be best understood from the attached drawings, taken along with the following description, in which similar reference characters refer to similar parts, and in which.

DETAILED DESCRIPTION OF AN EMBODIMENT

Figure 1:
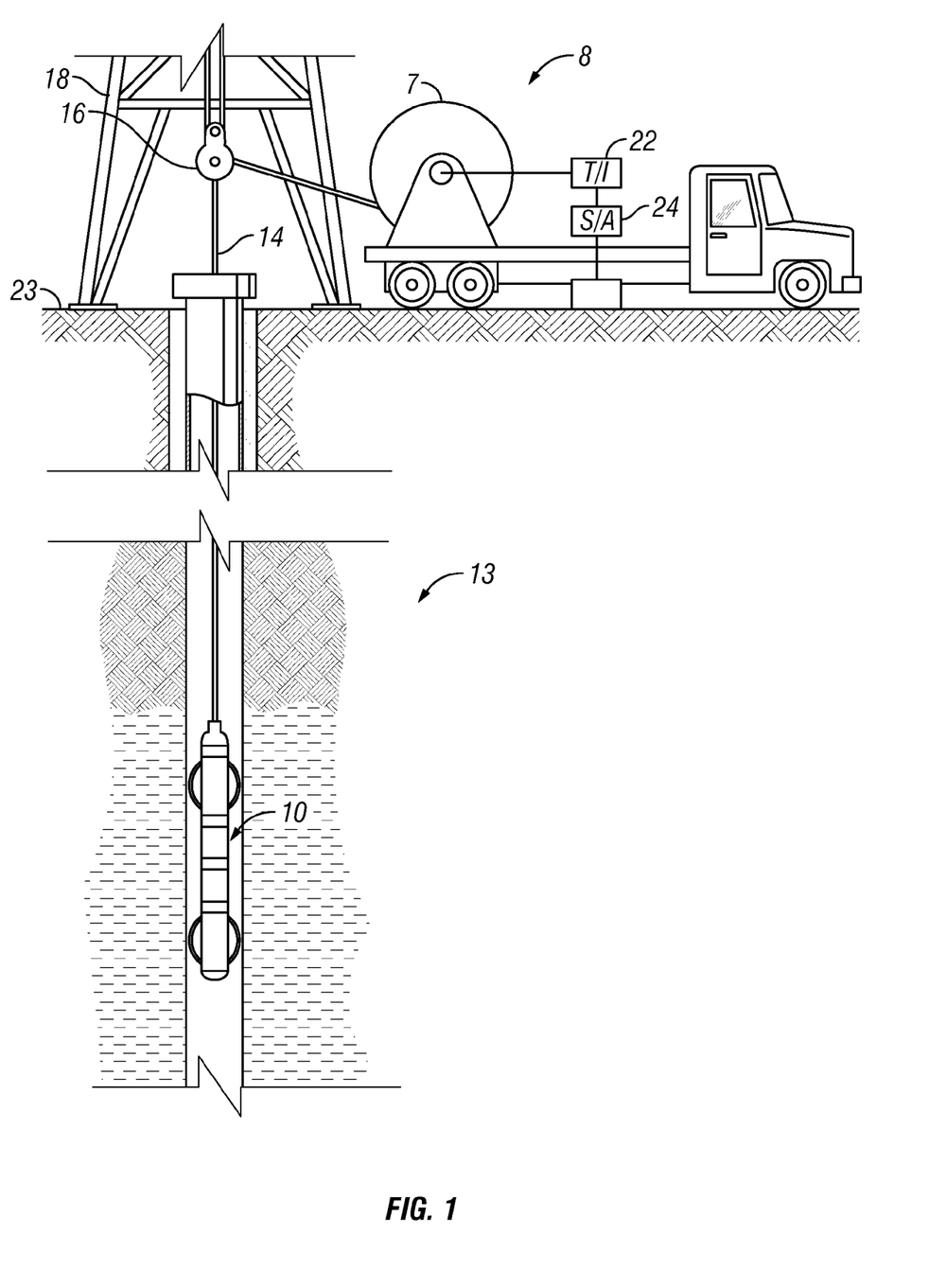
FIG. 1 shows an exemplary logging tool suspended in a borehole.

FIG. 1 shows an imaging tool 10 suspended in a borehole 12, that penetrates earth formations such as 13, from a suitable cable 14 that passes over a sheave 16 mounted on drilling rig 18. The cable 14 includes a stress member and seven conductors for transmitting commands to the tool and for receiving data back from the tool as well as power for the tool. The tool 10 is raised and lowered by draw works 20. Electronic module 22, on the surface 23, transmits the required operating commands downhole and in return, receives data back which may be recorded on an archival storage medium of any desired type for concurrent or later processing. The data may be transmitted in analog or digital form. Data processors such as a suitable computer 24, may be provided for performing data analysis in the field in real time or the recorded data may be sent to a processing center or both for post processing of the data. The data processor may be at the surface or provided downhole.

Figure 2:
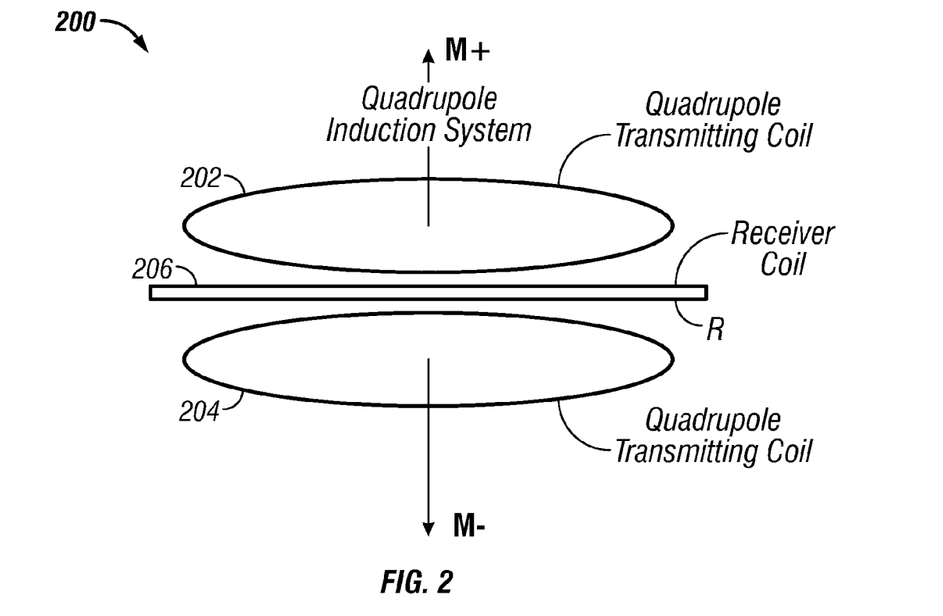
FIG. 2 illustrates a quadrupole transmitter with receiver coil placed in between two transmitting coils with opposite magnetic moments.

FIG. 2 illustrates a quadrupole transmitter 200 with two similar transmitter coils 202, 204 having magnetic moments oriented in opposite direction. A receiver coil 206 is placed between transmitter coils 202 and 204. Coils 202, 204 are separated by spacing d.

While the quadrupole sensor of Itskovitch was directed primarily towards the problem of distinguishing the direction of bed boundaries, we recognize that a quadrupole sensor also has improved resolution compared to a dipole sensor. Here the next step is done—from quadrupole to octupole. The reasoning behind it is simple: so far as the octupole field is decreasing with distance faster than the quadrupole one, its response should be more "local"—thus, an octupole sensor has to provide better spatial resolution than a quadrupole one. This theoretical assumption is confirmed by numerical experiments.

Figure 3:
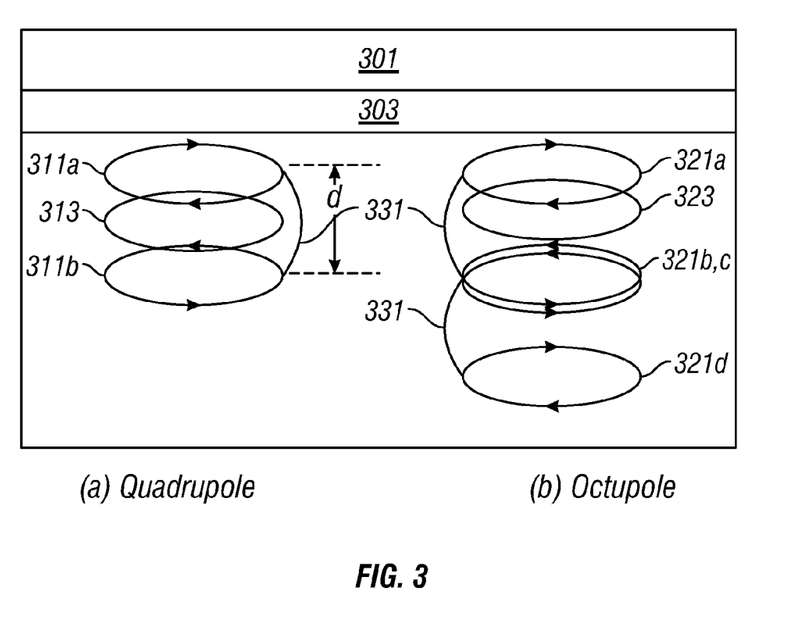
FIG. 3 shows a comparison between a quadrupole sensor and an octupole sensor.
Figure 4:
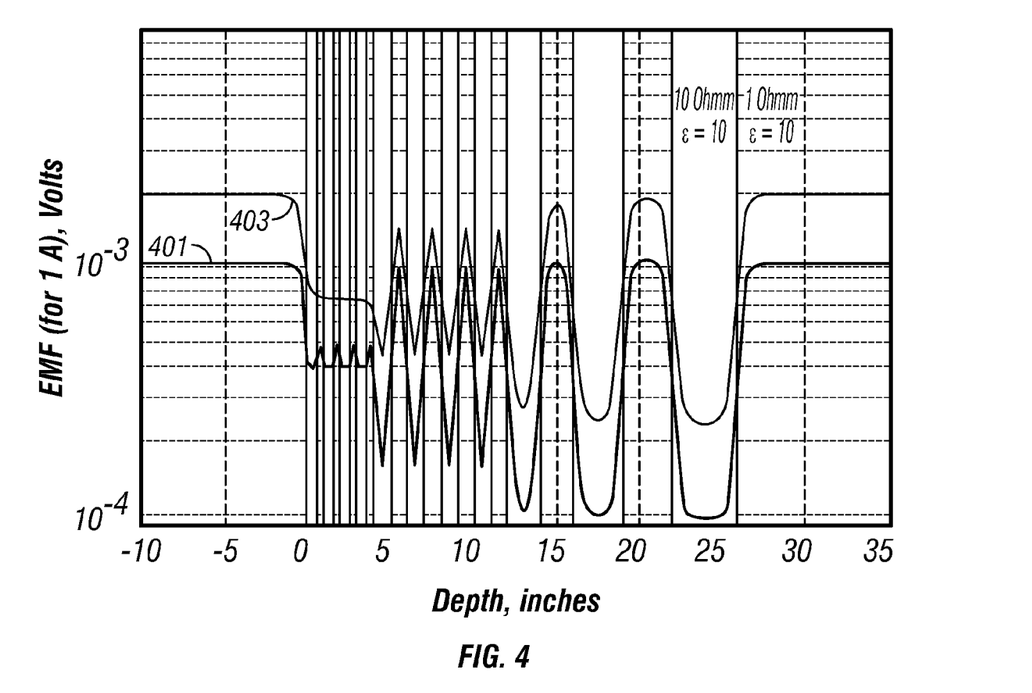
FIG. 4 shows a comparison between an octupole sensor and a quadrupole sensor for an exemplary model of a layered borehole with rugosity.

FIG. 4 shows a comparison of a radially directed quadrupole sensor and a radially directed octupole sensor. The quadrupole sensor comprises two transmitter antennas 311*a* and 311*b* connected by a twisted pair cable 331. The transmitter antennas are coupled with opposite polarity. A receiver antenna 313 is disposed between the two transmitter antennas.

The octupole sensor shown in FIG. 3 comprises four transmitter antennas 321*a*, 321*b*, 321*c* and 321*d*. These define a single transverse octupole transmitter antenna. "Transverse" means that the antenna axis is transverse to the tool axis, i.e., points into the formation 301. The standoff is denoted by 303. As can be seen, the four transmitter antennas are radially spaced apart so as to define a transverse octupole antenna. They are wired to form two quadrupole antennas with opposite polarity. A receiver antenna 323 is disposed between the individual antennas forming the octupole transmitter.

Turning now to FIG. 4, the responses of a quadrupole sensor and an octupole sensor are compared. An operational frequency 100 MHz was selected. The benchmark model comprised a vertical borehole 8.5" (21.6 cm) diameter, mud resistivity 1,000 Ω-m; a layered formation, the first boundary is z=0, 8 layers of thickness ½", then 8 layers of 1", then 2 layers of 2", then 2 layers of 3", then 1 layer of 4"; the parameters of odd-numbered layers are a resistivity of 1 Ω-m, permittivity 20, of even-numbered ones resistivity of 10 Ω-m, permittivity 10. A constant standoff of ⅛" (0.3175 mm) was simulated. The results of a finite-element simulation are shown. Only the modulus of the signal is shown. We see that the both sensors provide pretty good images; in thick layers any of the signals is proportional to formation conductivity. But the octupole sensor response 401 provides significantly better resolution in thin layers than the quadrupole sensor response 403. In particular, the octupole is able to resolve the thinnest ½" layers, while the quadrupole is not. We further note that signal level between the two sensors differs only by a factor of 2. In front of the formation 10 Ω-m resistivity, the induced electromotive force in the receiver is about 100 μV, for 1 A in the transmitter.

Figure 5:
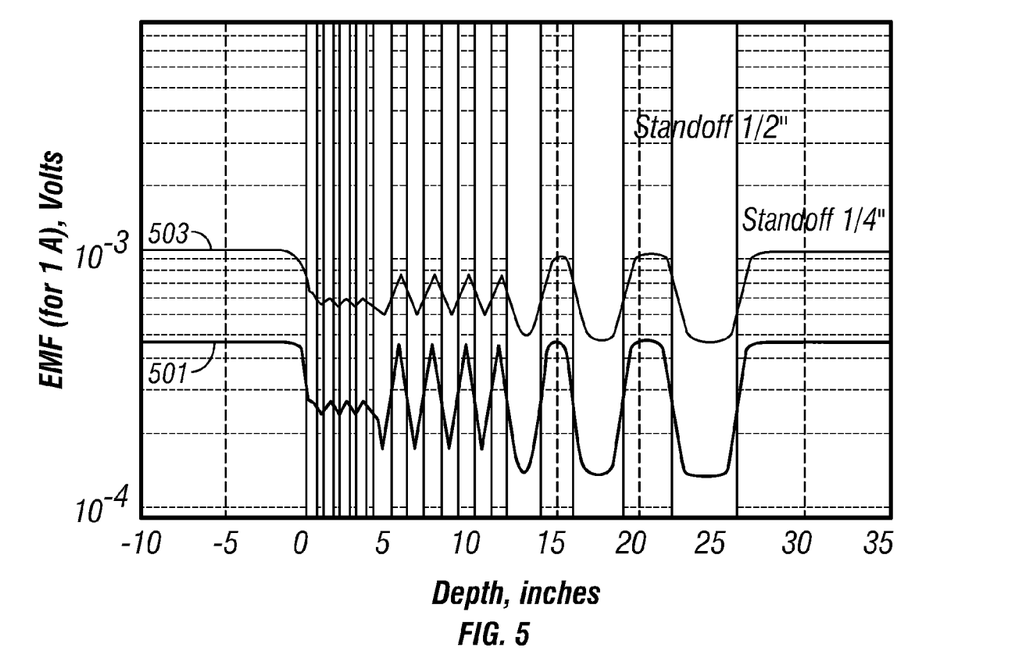
FIG. 5 shows a comparison between an octupole sensor and a quadrupole sensor for an exemplary model of a homogenous formation with layered rugosity.

The next considered benchmark was rugosity in homogeneous medium: 1 Ω-m, permittivity 20. The layering remains the same but now it corresponds to variations of the standoff only: ¼" in odd-numbered layers and ½" in even-numbered ones. A perfect imager should be immune to the standoff, i.e. its signal would be constant in this case. Unfortunately, neither the quadrupole 503 nor the octupole 501 satisfy this requirement: their signals considerably depend on the standoff. We also see that the octupole is more sensitive to standoff than is the quadrupole. The reason of this is the same as of its better resolution comparing to the quadrupole—the field locality.

Suppression of the parasite standoff sensitivity of induction imagers is very difficult task: greater standoff is almost indistinguishable from lesser conductivity. We disclose a dual-frequency approach for this problem of sensitivity to standoff. For relatively low frequencies—when both the skin- and dielectric effects in formation are negligible—the signal is just proportional to the square of frequency. It means that the second measurement, for another frequency, is a priori predictable from the first one, thus, it does not contain any new information. In other words, it is useless.

Figure 6:
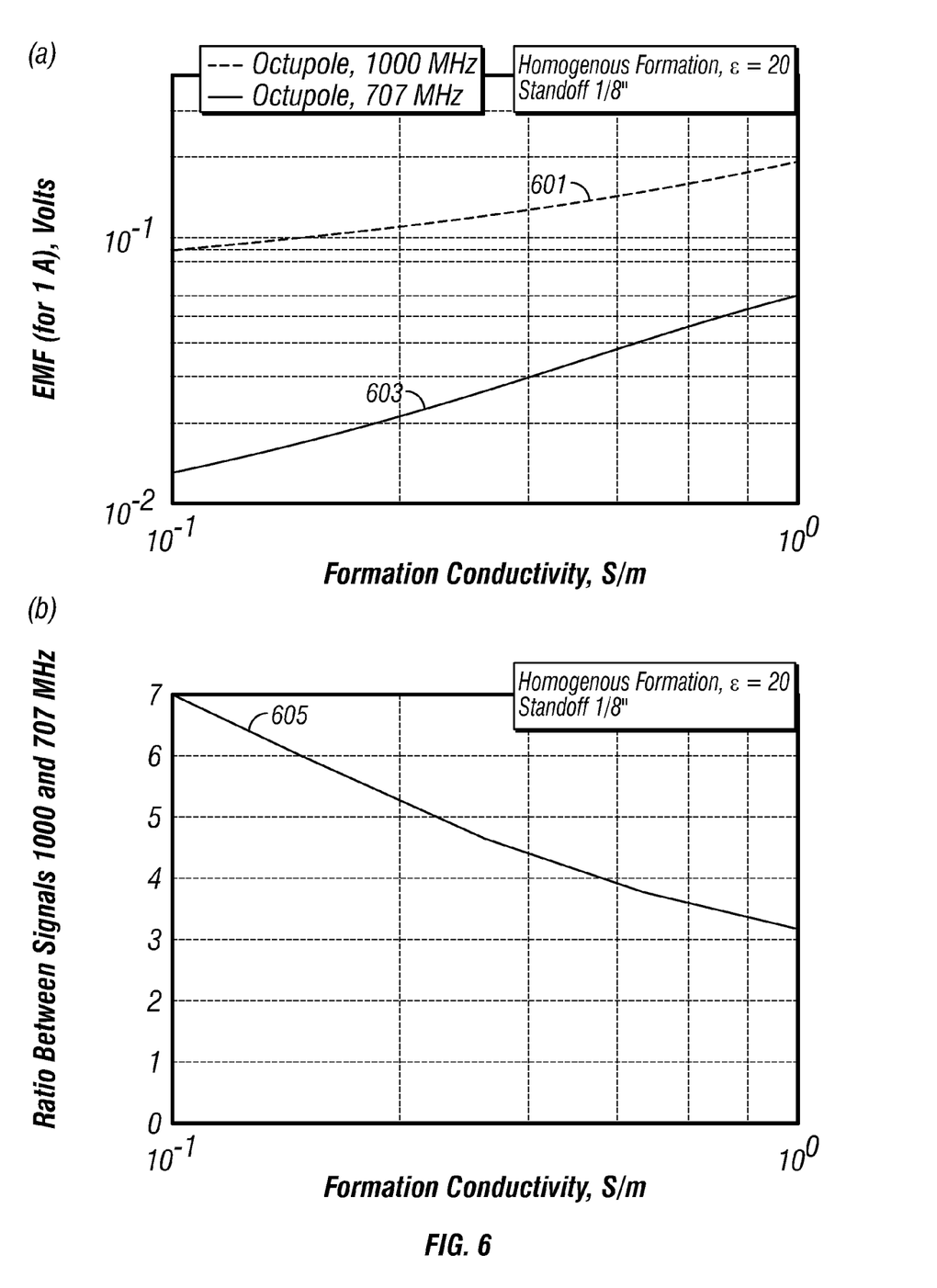
FIG. 6 illustrates (a) the response at two frequencies for an octupole as a function of formation conductivity, and (b) the ratio of the signals at the two frequencies.

The situation is different for very high frequencies, ~1 GHz, when the above-said is not valid anymore. FIG. 6 shows results of numerical simulation of the octupole response (the signal modulus) versus formation conductivity for frequencies 1 GHz 601 and 707 MHz 603. The curve 605 is the ratio between them. We see that this ratio is sensitive to formation conductivity.

Figure 7:
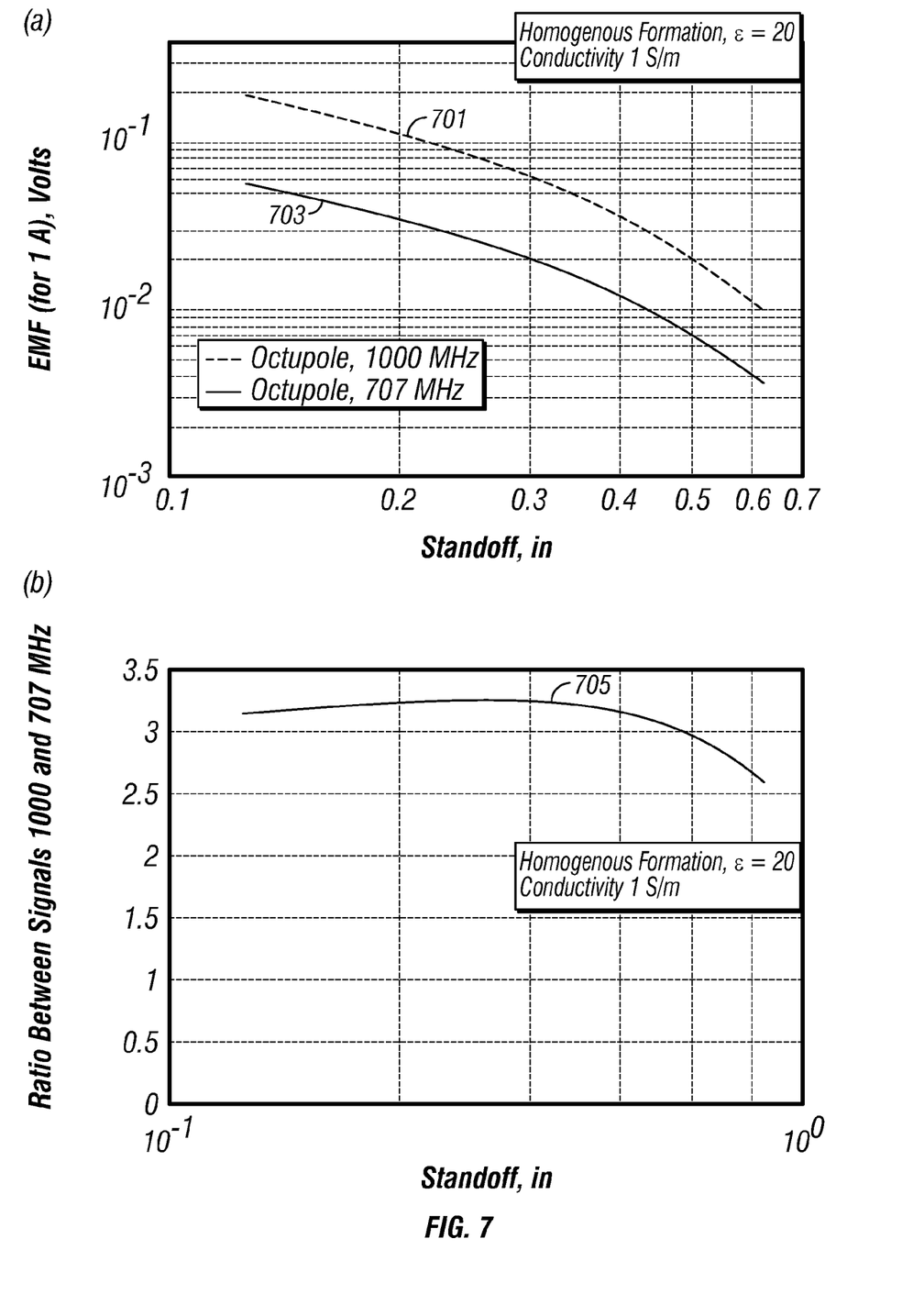
FIG. 7 illustrates (a) the response at two frequencies for an octupole as a function of standoff, and (b) the ratio of the signals at the two frequencies.

FIG. 7 shows results of numerical simulation of the octupole response (the signal modulus) versus standoff for frequencies 1 GHz 601 and 707 MHz 603. The curve 605 is the ratio between them. We see that this ratio is insensitive to standoff for values less than about 0.4" (1 cm.)

Figure 8:
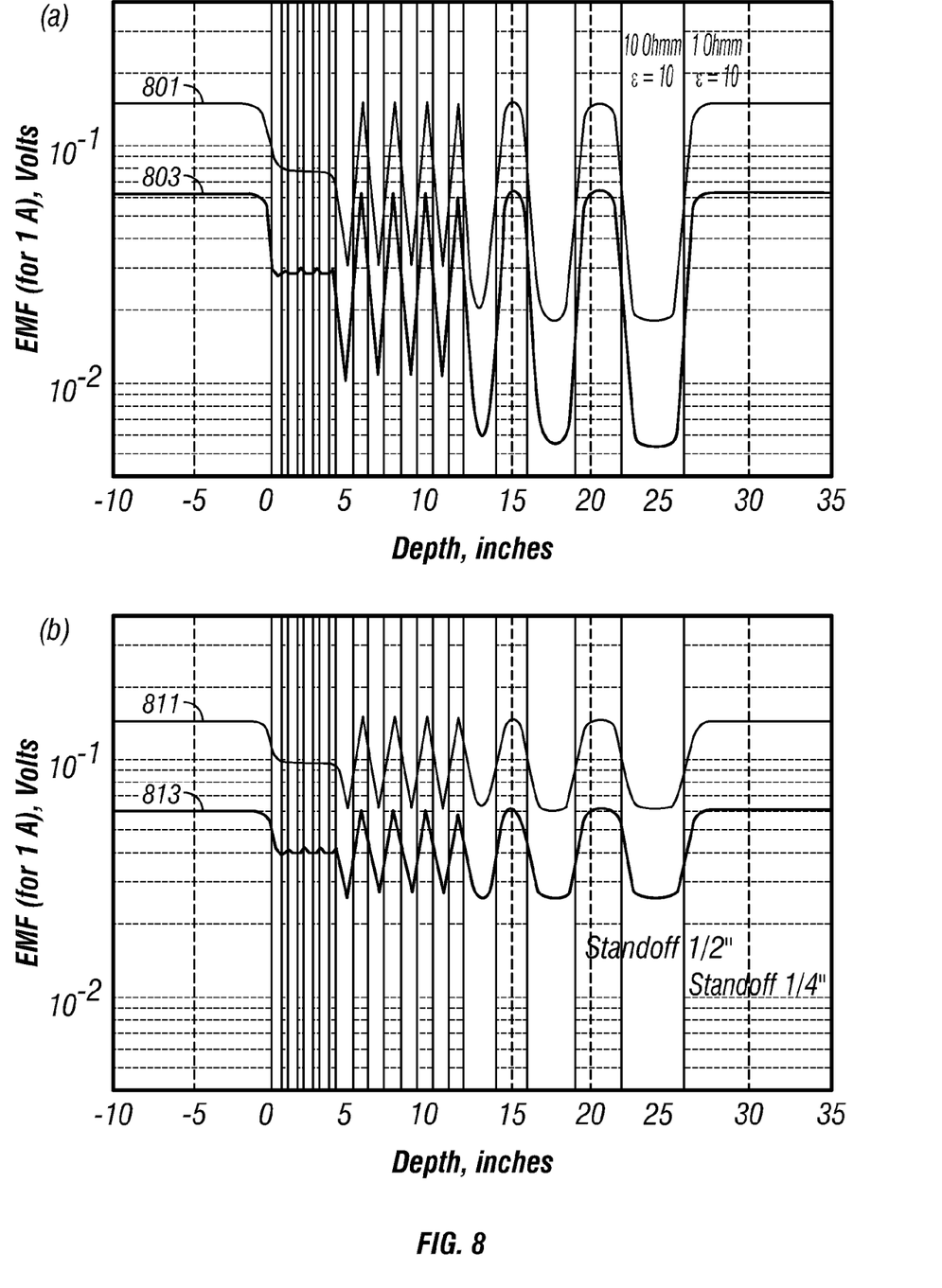
FIG. 8 illustrates (a)-(c) octupole responses 1,000 and 707 MHz for several benchmarks and (d) the dual frequency correction.

Application of this dual-frequency approach to the synthetic logs is illustrated in FIG. 8. FIG. 8*a* is for a layered resistivity model with constant standoff (similar to FIG. 4). The responses at 1 GHz 801 and 707 MHz 803 are shown. FIG. 8*b* is for a constant resistivity model with variable standoffs of ⅛" and ¼". The responses at 1 GHz 811 and 707 MHz 813 are shown. FIG. 8*c* is for a constant resistivity model with variable standoffs of ¼" and ½". The responses at 1 GHz 821 and 707 MHz 823 are shown. FIG. 8*c* is for a constant resistivity model with constant standoff (similar to FIG. 4). The responses at 1 GHz 811 and 707 MHz 813 are shown. FIG. 8*d* shows the signal ratio for all these three cases. We see that the ratio provides satisfactory image for the layered benchmark of FIG. 8*a* 831), and, at the same time, it is pretty immune to the standoff: the graph for the second benchmark of FIG. 8*b* 833 is almost constant. The result is not as good for the third benchmark of FIG. 8*c* 835, where the standoffs are twice as great. In any case, it is much better than for the raw signals. We note that the maximal standoff in FIG. 8*c* is 0.5" which exceeds the limit 0.4" established before from FIG. 7*b*.

Those versed in the art and having benefit of the present disclosure would recognize that at frequencies of the order of 1 GHz, a dielectric effects cannot be ignored. We next estimate the imaginary part of the generalized conductivity for 1 GHz and permittivity 20:

$$\omega \epsilon \epsilon_0 = 2\pi \cdot 10^9 \cdot 20 \cdot 8.85 \cdot 10^{-12} \approx 1.1.$$

Numerical simulation show that the response depends on formation resistivity and permittivity.

The individual transducers may be mounted on a pad on the logging tool. See, for example, U.S. Pat. No. 6,600,321 of Evans, having the same assignee as the present disclosure and the contents of which are incorporated herein by reference.

Implicit in the processing of the data is the use of a computer program implemented on a suitable machine readable medium that enables the processor to perform the control and processing. The term processor as used in this application is intended to include such devices as field programmable gate arrays (FPGAs). The machine readable medium may include ROMs, EPROMs, EAROMs, Flash Memories and Optical disks. As noted above, the processing may be done downhole or at the surface.

While the foregoing disclosure is directed to the preferred embodiments of the disclosure various modifications will be apparent to those skilled in the art. It is intended that all variations within the scope of the appended claims be embraced by the foregoing disclosure. Examples of the more important features of the disclosure have been summarized rather broadly in order that the detailed description thereof that follows may be better understood, and in order that the contributions to the art may be appreciated. There are, of course, additional features of the disclosure that will be described hereinafter and which will form the subject of the claims appended hereto.

What is claimed is:

1. An apparatus for evaluating an earth formation, the apparatus comprising:
    a logging tool configured to be conveyed into a borehole;
    a transverse octupole transmitter including a plurality of radially spaced apart transmitter antennas on the logging tool configured to transmit a signal into the formation;
    a transverse dipole receiver configured to receive a signal from the formation in response to the transmitted signal, wherein the transverse dipole receiver is positioned between at least one of the plurality of transmitter antennas and at least one other of the plurality of transmitter antennas; and
    at least one processor configured to estimate from the received signal a value of a property of the earth formation.

2. The apparatus of claim 1 wherein the transverse octupole transmitter comprises an electromagnetic transmitter.

3. The apparatus of claim 2 wherein the property of the earth formation is selected from: (i) a resistivity property, and (ii) a thickness of a layer in the earth formation.

4. The apparatus of claim 2 wherein the octupole transmitter is configured to operate at a first frequency and at a second frequency, and wherein the at least one processor is further configured to estimate the value of the property using the received signal at the first frequency and the second frequency.

5. The apparatus of claim 1 wherein the estimated property is substantially unaffected by a standoff of the transmitter.

6. The apparatus of claim 1 wherein the logging tool is configured to be conveyed into the borehole on one of: (i) a bottomhole assembly conveyed on a drilling tubular, or (ii) a logging string conveyed on a wireline.

7. A method of evaluating an earth formation, the method comprising:
    conveying a logging tool into a borehole;
    using a transverse octupole transmitter including a plurality of radially spaced apart transmitter antennas on the logging tool to transmit a signal into the formation;
    using a transverse dipole receiver to receive a signal from the formation in response to the transmitted signal, wherein the transverse dipole receiver is positioned between at least one of the plurality of transmitter antennas and at least one other of the plurality of transmitter antennas; and
    estimating from the received signal a value of a property of the earth formation.

8. The method of claim 7 further comprising using, as the transverse octupole transmitter, an electromagnetic transmitter.

9. The method of claim 8 further comprising determining at least one of: (i) a resistivity property, and (ii) a thickness of a layer in the earth formation.

10. The method of claim 7 wherein the estimate of the property is substantially unaffected by a standoff of the transmitter.

11. The method of claim 7 wherein conveying the logging tool into the borehole further comprises using one of: (i) a bottomhole assembly conveyed on a drilling tubular, or (ii) a logging string conveyed on a wireline.

12. A non-transitory computer-readable medium product having thereon instructions that when read by at least one processor cause the at least one processor to execute a method, the method comprising:
    estimating, from a signal received by a transverse dipole receiver on a logging tool in a borehole responsive to activation of a transverse octupole transmitter including a plurality of radially spaced apart transmitters on the logging tool a value of a property of the earth formation.

13. The non-transitory computer-medium product of claim 12 further comprising at least one of; (i) a ROM, (ii) an EPROM, (iii) an EAROM, (iv) a flash memory, or (v) an optical disk.

* * * * *